Oct. 11, 1955 L. E. CHAMBERLAIN 2,720,237
VEHICLE CARRIED ANTI-SKID DEVICE
Filed March 19, 1954 2 Sheets-Sheet 1
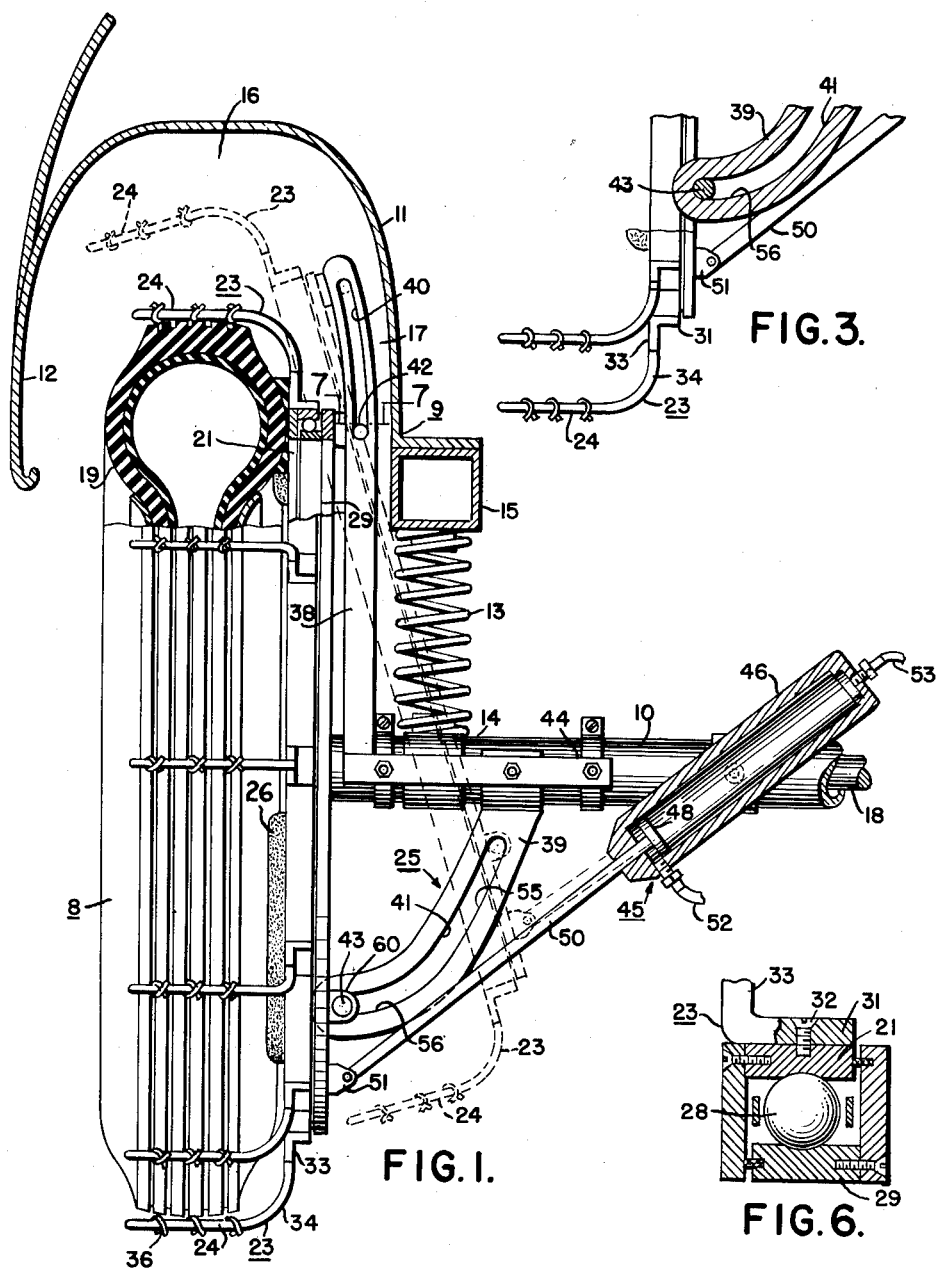
INVENTOR
Lamar E. Chamberlain
ATTORNEYS

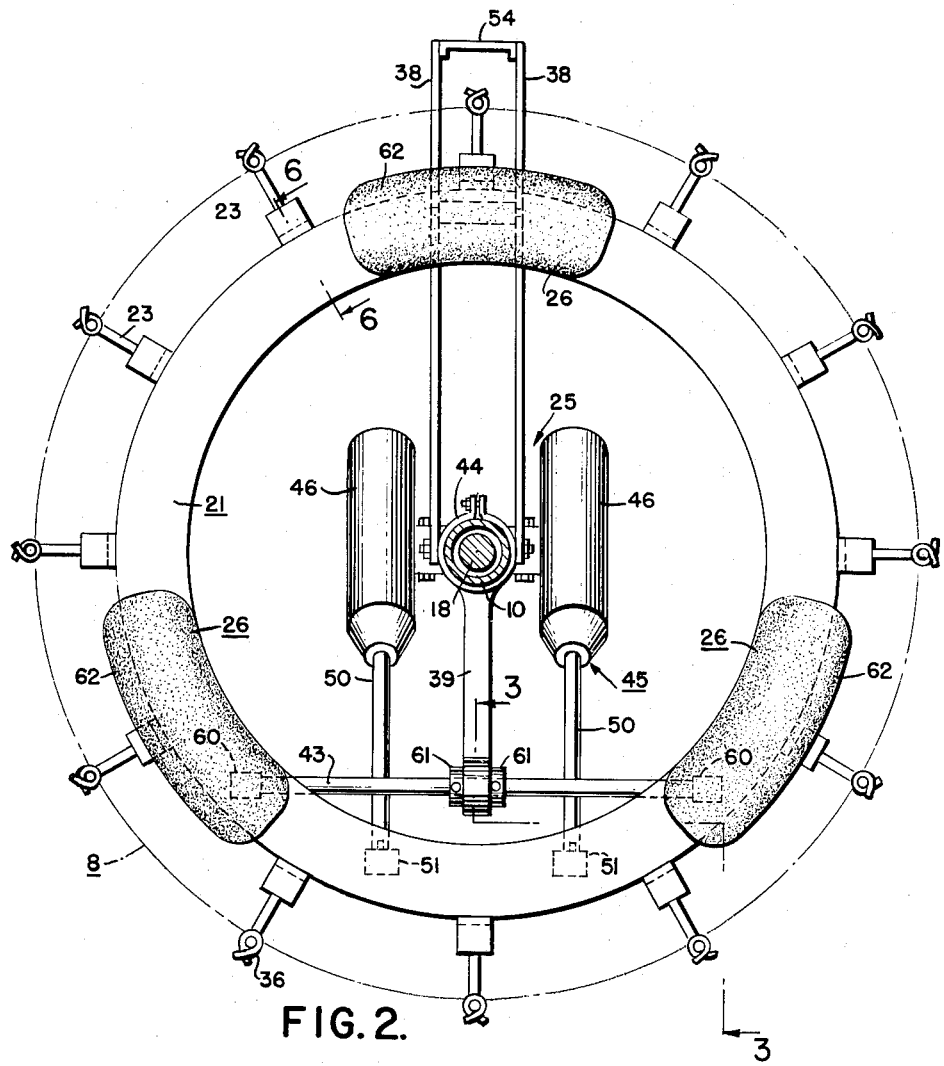

United States Patent Office 2,720,237
Patented Oct. 11, 1955

2,720,237
VEHICLE CARRIED ANTI-SKID DEVICE
Lamar E. Chamberlain, Hamburg, Pa.

Application March 19, 1954, Serial No. 417,275

10 Claims. (Cl. 152—214)

This invention relates to nonskid devices for association with the driving or ground wheels of motor vehicles and trailers, and this application is a continuation-in-part of my application filed March 10, 1953, Serial No. 341,409, now abandoned, for metal nonskid grip to be applied to the driving wheels of motor vehicles.

Aside from the types of nonskid chains and traction devices applicable to ground wheels of motor vehicles, when same are "jacked up" or the vehicles are not moving, various devices have been proposed to apply nonskid or traction devices to engage the peripheries of and rotate with such wheels, while the vehicles are moving, such devices being under the control of the operators of the vehicles or assistants while located in the driving or passenger compartments of the vehicles. These devices are rather complicated and not readily applicable to contemporary or recent models of motor vehicles and trailers, especially where the bodies thereof are streamlined and greater space for passengers are provided than was the practice some years ago. This modern practice or design has, to some extent, diminished the clearance between the ground wheels and the body and due to efficient shock absorbing means between the chassis and body, made possible reduced clearance between the ground wheels and fenders or mud guards.

The principal object of the invention is to provide nonskid devices, embodying wheel or tire tread engaging cleats, applicable to contemporary vehicles or those slightly modified to accommodate the devices, and which may each be actuated to a use position and to a non-use position by an operator or passenger of the vehicle, while the vehicle is in motion, say from a location in the driver's or passenger's compartment of the vehicle. Since, in a practical embodiment of the device, it may be hydraulically operated to the use and non-use positions, the invention is also applicable to the ground wheels of trailers, which may also be equipped with hydraulically operated brakes, all operated from the towing vehicle, due to modern hydraulic connections between towing or tractor vehicles and trailers. In this way on slippery highways the nonskid cleats of the present invention may be brought into use positions when needed, and actuated to a non-use position without stopping the vehicle or vehicles when the highway is dry. The result is less wear on the nonskid elements or cleats, since they may be easily and quickly retracted from use positions and not run on dry highways. When applied to trailers, greater safety results, since the brakes of the trailer are rendered more efficient on slippery highways, to counteract the momentum of the trailer, if the trailer wheels have additional nonskid devices applied thereto, brought into use when needed.

Another object is to provide such nonskid devices which, when in non-use positions, will be sufficiently above the highway surface as to not encounter abnormal materials on the highway, such as stones, branches, etc. over which the vehicles are passing, or if encountering same, will merely cause rotation of a rotor carrying the cleats.

Other objects and advantages will appear in the following detailed description of one embodiment of the present invention, taken in connection with the accompanying drawings, forming a part of this specification, and in which drawings:

Fig. 1 is a view partly in elevation and partly in vertical section, transversally of the tire and adjacent parts, showing the invention mainly in full lines, in "use" position with respect to the ground wheel; and in dotted lines, moved and retained in a "non-use" position.

Fig. 2 is a view partly in elevation and partly in vertical section through the live axle and its housing of an automobile, the periphery of the tire portion of the wheel being shown by dot and dash lines and illustrating the nonskid device carried by the axle housing and in a "use" position.

Fig. 3 is a sectional view on substantially the line 3—3 of Fig. 2.

Fig. 4 is a fragmentary plan view of hydraulic mechanism suitable for use in actuating the nonskid means to "use" and "non-use" positions.

Fig. 5 is a sectional view on substantially the line 5—5 of Fig. 4.

Fig. 6 is an enlarged sectional view on the line 6—6 of Fig. 2.

Fig. 7 is a fragmentary sectional view on the line 7—7 of Fig. 1.

In the drawings I disclose the invention as applied to the driving wheel 8 forming a part of a vehicle chassis 9 which includes a fixed axle member 10 extending transversely of the chassis at the inner side of the plane of the wheel. On member 10 is mounted a vehicle body portion 11, including a conventional fender or mud guard portion 12, through a coil spring 13. The lower portion of the spring is mounted on a spring seat 14 carried by member 10, and the upper end of the spring bears against the underside of a body stringer 15. All of these portions of the vehicle are conventional and are illustrated merely by way of example to more clearly emphasize the clearance space or zone 16 usually provided above the tread of the wheel 8 and the clearance space or zone 17 usually provided between the inside of the wheel 8 and body portion 11.

It is to be understood that the foregoing is merely by way of example since the device of the present invention is applicable to various makes and models of motor vehicles and trailers, and as to the latter, the fixed axle member does not contain a live axle 18, such as is shown in the drawings and the fixed axle member may not extend with its axis coaxial with the wheel and normal to the plane of the wheel throughout its length.

The wheel 8 includes any suitable tire 19, usually of the pneumatic type, although the invention may conceivably be applied to a solid rubber tire.

Broadly, the invention comprises a rotor 21 encircling, in spaced relation, the axle member 10 and in a use position, revoluble in a plane to the inner side of the plane of the wheel 8 and coaxial with the wheel; cleat members 23 carried by the rotor in spaced relationship circumferentially thereof and including outwardly extending ground engaging elements 24 engaging the tread of the tire 19 when in a use position; means 25 for bodily moving the rotor and its cleat members to a non-use position inwardly of the chassis 9 and in upwardly off-set eccentric relationship with respect to the axis of and out of engagement with the wheel 8; and preferably impelling means 26 fixedly carried by the rotor 21, engaging the wheel 8; and preferably the inner side wall of the tire 19 when the device is in a use position, for rotation of the rotor 21 by rotation of the wheel 8.

In a practical embodiment of the invention, the rotor 21 is annular in shape and constitutes the outer race for antifriction members 28, such as balls, which together with a stator 29 of annular shape provide the inner race for the members 28, forms a part of the means 25. The annular rotor 21 and annular stator 29 are held coaxial and against lateral movement one with respect to the other, in the example shown, by the balls 28 having portions running in circumferential grooves in the confronting faces of the rotor and stator in the manner quite common in the art of ball bearings, as shown in Fig. 6.

The cleat members 23 may be of any suitable material and of any desired formation, but in the example shown each is preferably made of metal, comprising a plate-like arcuate attaching portion 31, curved to conform with the contour of the rotor periphery and detachably secured to the rotor by screws 32, a flange portion 33 in right angular outstanding relation to the portion 31, a comparatively slender goose-neck portion 34 arching or springing from portion 33 in an outward direction with respect to the chassis 9, and the outwardly extending ground engaging element 24, hereinbefore referred to, extending from the goose-neck portion 34. The portions 24 and 34 may be heat treated, or otherwise rendered flexible to the extent that they may yield to some extent when encountering solid projecting objects on the highway and spring back to normal position when freed from such objects. The portion 24 may be provided with a number of calks 36 or the like in spaced relation longitudinally thereof, such as looped pieces of wire welded or otherwise secured to the portion 24.

The means 25, in the example shown comprises, in addition to the stator 29 and antifriction members 28, upstanding and depending guide arms 38 and 39, provided with cam-like slots 40 and 41, in which slide follower members 42 and 43 respectively, secured to the stator 29, these guide arms being rigidly and adjustably clamped or otherwise secured to the fixed member 10 by a frame 44; and an actuating mechanism 45, in the example shown comprising two hydraulic cylinders 46 pivotally carried at opposite sides of the fixed axle member 10 by adjustable bracket 47, pistons 48 reciprocable in the cylinders, piston rods 50 connected to the pistons and pivotally connected to the stator 29 by brackets 51 and hydraulic flexible conduits 52 and 53 in communication with the opposite end portions of each cylinder 46 through which fluid under pressure may be introduced into either end of the cylinder, at the will of the operator from any suitable source of fluid under pressure and control devices, not shown in the drawings, but which are common in various arts such as that relating to hydraulic brakes.

It is preferred to provide two upstanding guide arms 38, as shown in Fig. 2 connected at their upper end portions by a brace bar 54. The cam-like guide slot 40 of each arm 38 is arcuated slightly from its lower end upwardly and outwardly so as to guide, through the follower member 42, the upper portion of the stator 29 and parts carried thereby into the clearance space or zone 16 of the vehicle body as shown by dotted lines in Fig. 1. A single guide arm 39 is shown depending from the attaching frame 44 and the guide slot 41 of the arm is preferably straight throughout the major portion 55 of its length extending from the upper end adjacent to the fixed axle member 10 diagonally downwardly and outwardly toward the lower portion of the wheel 8, and arcuate throughout a minor portion 56 of its length, from the lower end of the straight major portion 55 curving downwardly and outwardly from the lower straight major portion 55 to the lower end of the slot, which end is fairly near the wheel 8, as shown in Fig. 1. This slot 41, through the follower 43 functions to guide the lower portion of the stator 29 and parts carried thereby, first in an inward direction toward the longitudinal center of the vehicle chassis, and then upwardly to a non-use position below the fixed axle member 10 and well clear of any projecting obstructions on the highway. Thus, when the actuating mechanism 45 is brought into use as by introducing fluid under pressure into the lower end portions of the cylinders 46, the stator 29 will be moved to a canted position to lie in a plane diagonally downwardly and inwardly with respect to the plane of the wheel 8, as shown by dotted lines in Fig. 1. Introducing fluid under pressure into the upper end portions of the cylinders 46 will result in the stator being guided to a use position concentric with the axis of the wheel in a plane parallel to the plane of the wheel as shown in full lines in Fig. 1.

The follower 42 may be connected to the stator 29 by a bracket 57 and may have its end portion reduced to provide outwardly facing shoulders 58 for engagement with the confronting faces of the arms 38 to retain the stator in proper position with respect to the wheel or, in other words, to help keep the stator coaxial with the wheel when in a use position.

The follower 43 may be in the form of a rod secured at its ends to the stator 29 by brackets 60 and there may be provided collars 61 secured to the follower at opposite sides of the arm 31, loosely engaging the opposite side faces thereof, to also steady the stator, particularly when in a use position.

The arms 38 may be made relatively slender so as to be accommodated in the comparatively narrow clearance space or zone 17 between the inside of the wheel 8 and body portion 11.

Referring now to the impelling means 26 it preferably comprises a plurality of yieldable pads or cups 62 fixedly secured to the outer face of the rotor 21, spaced apart circumferentially thereof, and circumferentially arcuated, for engagement with the inner side wall of the tire 8, as shown in Figs. 1 and 2. These pads or cups may be made of rubber or other suitable material capable of so frictionally engaging the wheel, and especially the tire, that, through such intimate engagement, and without the necessity of providing any additional device or devices for cooperation with the pads or cups, rotation of the wheel will impart rotation to the rotor 21. The pads or cups may be of elongated arcuate shape as shown in Fig. 2 and are preferably so spaced that accumulated snow, ice, or other foreign matter on the inner side of the tire and on the pads or cups will be rubbed from the normally confronting faces, as the device is being brought into a use position.

The operation of the nonskid device will be clear from the foregoing description, however it is pointed out that the preferred construction and arrangement of parts permits of bodily adjusting the arms 38 and 39 toward and from the plane of the wheel, when the stator and parts carried thereby are in a use position, through the frame 44 adjustable longitudinally of the fixed axle member 10, so as to bring about proper pressure of the pads or cups 62 against the inner side wall of the tire for proper simultaneous rotation of the rotor 21 and the wheel 8. Also, because of the shape of the minor portion 56 of the guide slot 41, the portions 24 of the cleats 23 are eased outward in substantially a horizontal direction to a position engaging the lower portion of tire tread, as the device is being moved to a use position and the vehicle is moving, and are likewise initially eased to a non-use position, by the shape of the minor portion 56 of the guide slot 41.

I claim:

1. In combination with a vehicle chassis of the type comprising a ground wheel including a tire and a fixed axle member extending transversely of the chassis at the inner side of the plane of the wheel; a nonskid device carried by said axle member comprising an annular stator encircling and spaced from said axle member, adjacent the inner side of the wheel, an annular rotor concentric with and carried by said stator, means supporting said stator and rotor in a first position of non-use, elevated and canted with respect to the axis of the wheel to lie in a plane diagonally downwardly and inwardly with respect to the plane of the wheel and movable to a second position of use concentric with axis of the wheel and in a plane parallel to the plane of the wheel, cleat members carried by said rotor in spaced relationship circumferentially thereof and including outwardly extending ground engaging elements engaging the tread of said tire when said stator and rotor are in said second position, and means for moving said stator and rotor from said first position to said second position and vice versa.

2. The combination as set forth in claim 1 in which said rotor fixedly carries impelling means engaging the wheel at its inner side when said stator and rotor are in said second position for rotation of the rotor by rotation of the wheel.

3. The combination as set forth in claim 2 in which said impelling means comprises a plurality of members spaced apart circumferentially of the rotor for engagement with the inner side wall of the tire when said stator and rotor are in said second position.

4. The combination as set forth in claim 2 in which said impelling means comprises a plurality of members spaced apart circumferentially of the rotor and arcuated circumferentially with respect thereto for engagement with the inner side wall of the tire.

5. The combination as set forth in claim 2 in which said impelling means comprises a plurality of yieldable pads spaced apart circumferentially of the rotor for engagement with the side wall of the tire.

6. The combination as set forth in claim 1 in which said means supporting said rotor comprises a first guide for the upper portion of said stator for movement of it in a path inwardly and downwardly with respect to chassis from its non-use to its use position and vice versa, and second guide for the lower portion of said stator for movement of it in a path downwardly and outwardly from its non-use to its use position and vice versa.

7. The combination as set forth in claim 6 in which said first and second guide each comprises an arm, provided with a curved slot, secured to said fixed axle member, and a traveler carried by said stator, movable in the slot of its respective arm.

8. The combination as set forth in claim 7 in which each of said travelers is provided with shoulders engaging its respective slotted arm to retain said rotor in said concentric relationship with the wheel when said stator and rotor are in said second position.

9. The combination as specified in claim 1 in which said last mentioned means includes a hydraulic cylinder pivotally carried by said axle member to swing about a horizontal axis, a piston in said cylinder, a piston rod for said piston, and means pivotally connecting said rod at its end opposite said piston, to the lower portion of said stator.

10. In combination with a vehicle chassis of the type comprising a ground wheel including a tire and a fixed axle member extending transversally of the chassis at the inner side of the plane of the wheel; a non-skid device carried by said axle member, comprising a rotor carried by and encircling in spaced relation said axle member and revoluble in a plane parallel to the plane of the inner side of the wheel and concentric with the axis of the wheel, cleat members carried by said rotor in spaced relationship circumferentially thereof and including outwardly extending ground engaging elements engaging the tread of said tire, and means for bodily moving said rotor and cleat members to a non-use position inwardly of the chassis and in upwardly offset eccentric relationship with respect to said axis of said wheel and out of engagement with said wheel.

References Cited in the file of this patent

UNITED STATES PATENTS

| | | |
|---|---|---|
| 851,432 | O'Leary | Apr. 23, 1907 |
| 2,126,961 | Hodgkinson | Aug. 16, 1938 |
| 2,277,036 | Chaussee | Mar. 24, 1942 |
| 2,532,309 | Hoffmann | Dec. 5, 1950 |